United States Patent [19]

Paillet

[11] Patent Number: 4,471,246
[45] Date of Patent: Sep. 11, 1984

[54] ELECTRIC MOTOR HAVING IMPROVED CONSTRUCTION TO FACILITATE ASSEMBLY

[75] Inventor: Pierre Paillet, Valence, France

[73] Assignee: Crouzet, Paris, France

[21] Appl. No.: 438,275

[22] Filed: Nov. 1, 1982

[30] Foreign Application Priority Data

Nov. 12, 1981 [FR] France .................... 81 21349

[51] Int. Cl.³ .................................... H02K 15/00
[52] U.S. Cl. ............................... 310/42; 310/40 MM; 310/90; 29/596; 384/428
[58] Field of Search ............. 310/49, 214, 42, 194, 310/40 MM, 162, 208, 163, 164, 90, 89, 91; 308/DIG. 11; 384/428, 439; 29/596

[56] References Cited

U.S. PATENT DOCUMENTS

| 3,234,418 | 2/1966 | Tomako ....................... 310/164 |
| 3,508,327 | 4/1970 | Diederichs ..................... 310/42 |
| 3,684,907 | 8/1972 | Hinachi ........................ 310/164 |
| 3,701,911 | 10/1972 | Hallerback ..................... 310/90 |
| 3,711,732 | 1/1973 | Gerber ......................... 310/162 |
| 3,906,164 | 9/1975 | Kuwako ........................ 310/162 |
| 4,076,989 | 2/1978 | Watson ......................... 310/89 |
| 4,107,559 | 8/1978 | Patel ........................ 310/40 MM |
| 4,255,681 | 3/1981 | Gerber ...................... 310/40 MM |

Primary Examiner—R. Skudy
Attorney, Agent, or Firm—Holman & Stern

[57] ABSTRACT

Assembly of a small electric motor is facilitated by pre-assembling each coil with a support bearing and a corresponding pole piece, as well as with the cylindrical magnetic coil housing. Each support bearing includes a pair of radially-extending hooks which engage corresponding edges on the inner bore of each coil to properly align the components. The thusly pre-assembled stator sub-assembly may be inverted to receive the rotor assembly.

3 Claims, 3 Drawing Figures

ELECTRIC MOTOR HAVING IMPROVED CONSTRUCTION TO FACILITATE ASSEMBLY

BACKGROUND OF THE INVENTION

The present invention relates to small electric motors and more particularly to synchronous motors and step-by-step motors comprising a rotor with permanent magnet, magnetized along a plurality of pairs of poles, fast with a shaft rotating in two bearings supported by a stator. The stator is constituted by an assembly of two coils and of polar pieces disposed inside a carcase of magnetic material.

Motors of this type are wide-spread and widely used in industry. They are mass-produced and production thereof has been optimalized by reducing the number of their constituents to the strict minimum and by using identical pieces whenever possible. This is the case, for example, of the coils, if there are several of them, and of the polar pieces.

In order to reduce the cost price of this type of motor further, they must be studied with a view to saving time during manufacture, by simplifying assembly thereof and reducing the number of the operations on separate work stations.

It is an object of the present invention to produce such a motor. In fact, the various constituents of this motor have been studied and arranged to facilitate assembly therof on a production line. Manufacture consists in assembling its various constituents by stacking so as to make a solid sub-assembly which is easy to transfer thereafter onto an electric welding station. One operation suffices to weld, simultaneously, two side elements disposed on either side of its magnetic carcase to close it definitively.

SUMMARY OF THE INVENTION

To this end, the motor according to the invention is characterized in that it comprises means for maintaining pre-assembled during assembly, on the one hand, each coil with a support bearing and the corresponding polar piece and, on the other hand, the coil or the two coils inside the magnetic carcase. To assemble such a motor, it then suffices to stack the various components of the stator for example on a cylindrical guide having substantially the diameter of a rotor.

Due to the support means provided, the sub-assembly thus constituted may be turned over in order to introduce a rotor therein before being definitively closed by electric welding, at certain privileged points, of two side elements on each of the lower and upper faces of the magnetic carcase.

The pre-assembly means of the invention are characcrerized in that each support bearing, moulded in a plastic material, comprises at least two small hooks whose purpose is to hook on two edges provided in the inner bore of the or each coil and in that its magnetic carcase, obtained from a rolled sheet plate, has the form of a laterally open cylinder.

In this opening, four projections join the or each coil with the carcase by elastic clamping on the or each wire-pass.

BRIEF DESCRIPTION OF THE DRAWINGS

The invention will be more readily understood on reading the following description with reference to the accompanying drawings, in which.

DETAILED DESCRIPTION OF A PREFERRED EMBODIMENT OF THE INVENTION

Figure 1:
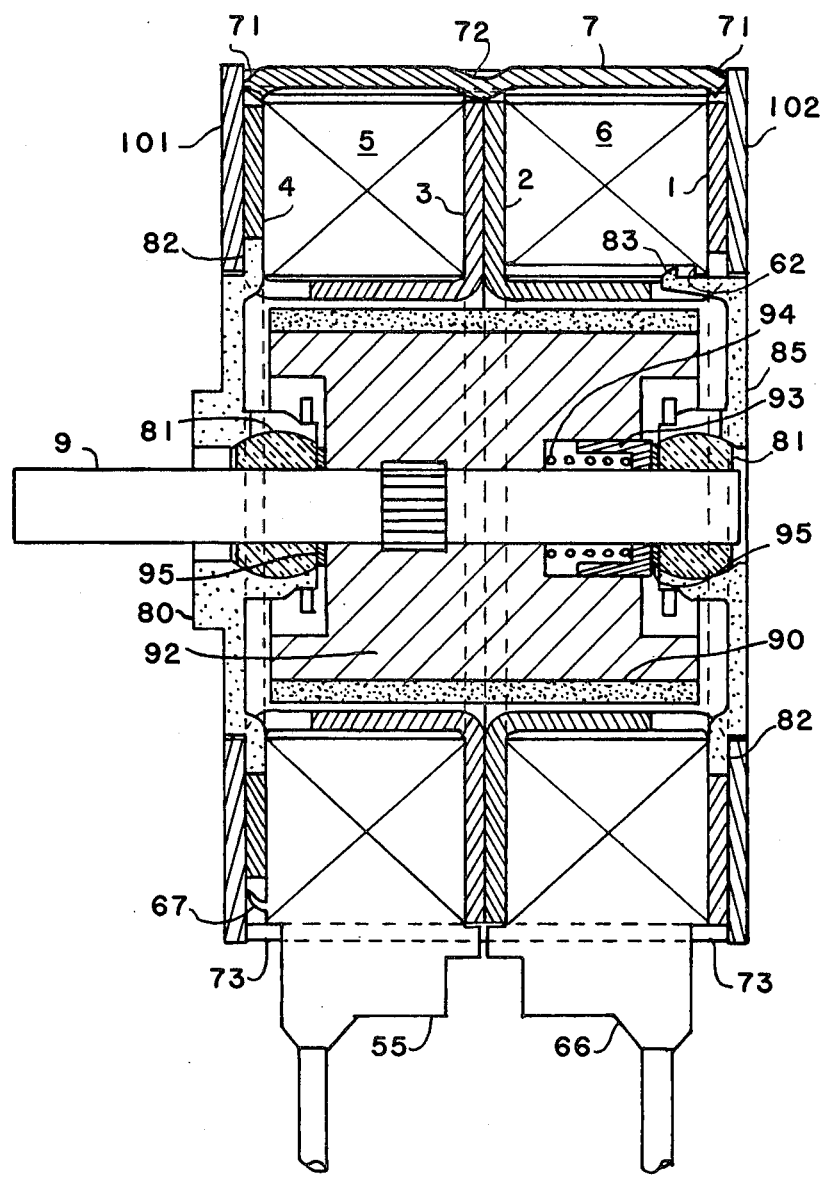
FIG. 1 is a view of the motor in section.

Referring now to the drawings, and as shown in FIG. 1, the stator of the motor is made in known manner by an assembly of the two coils 5, 6 and of polar pieces 1, 2, 3 and 4, made of magnetic material, which cover the coils so as to channel the magnetic flow. A cylindrical piece or housing 7, also made of magnetic material such as for example galvanized sheet plate surrounds the whole to close the magnetic circuit. Two support bearings 80 and 85, moulded in insulating, amagnetic material, are assembled and adjusted on the outer polar pieces 1 and 4. The two coils are identical, as are the four polar pieces. These elements are provided with means for angular pre-positioning which, in the course of assembly, oblige their relative positions necessary for the motor to function, to be respected.

Figure 3:
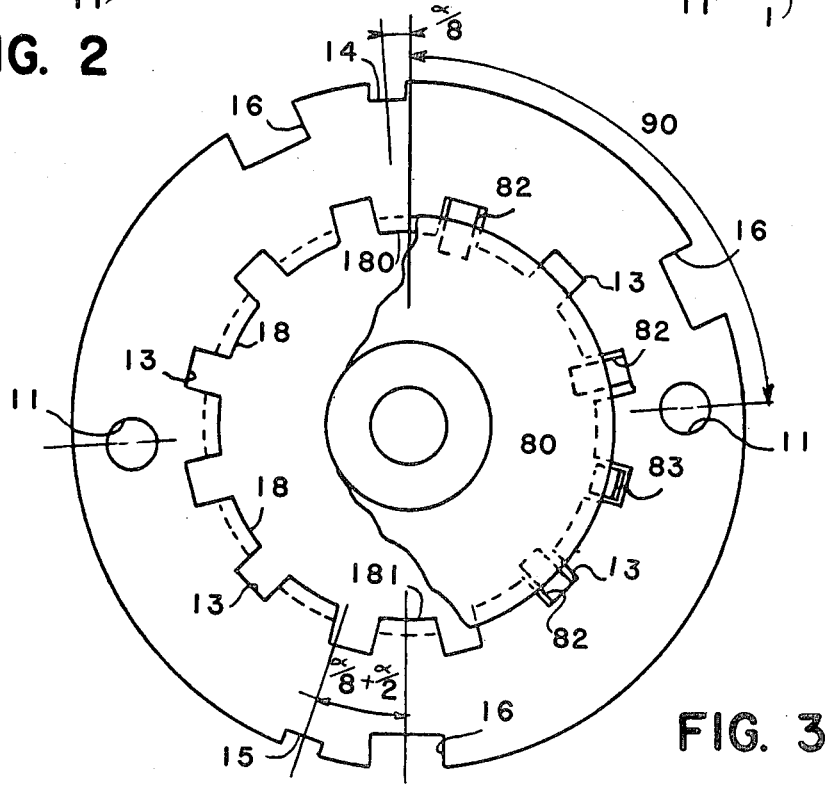
FIG. 3 shows the relative arrangement of a polar piece and a support bearing.

Each polar piece (FIG. 3), in addition to the poles 18 whose number corresponds to the pairs of poles $\alpha$ of the motor, is thus provided with two holes 11 which are diametrically opposite on the same radius and of identical diameters. These holes are disposed on an axis at 90° with the axis of symmetry of one of its poles, pole 180 for example. For its part, the coil is provided, on one of its sides, with a lug 61/51, disposed on the same radius as the holes 11 and having a diameter enabling it to penetrate with slight clearance into said holes. This lug makes an angle of 90° with the axis of passage of the wire-pass 66/55 of the coil.

The support bearings 80 and 85 each have hooks 83 and radial protuberances 82. These protuberances may be adjusted with clamping in the bottom of the notches 13 corresponding to the cut-out of the poles.

For example, for a motor having twelve pairs of poles ($\alpha = 12$), there are six radial protuberances disposed at 60° with respect to one another and two diametrically opposite hooks.

These protuberances make it possible to centre the support bearings 80 and 85 strictly in the polar pieces and consequently to obtain a correct centering of the shaft 9 of the rotor 92 in the bearings 81 which are received by the supporting bearings.

Finally, the polar piece comprises, in addition to the two holes 11 set with respect to the axis of a pole, two radial notches 14 and 15 on its periphery as well as three notches 16. The notches 16 serve as simple clearances to allow passage of three small screens 67 integral with the side face of the coil, on the side not comprising the lug.

The position of these screens corresponds to the location of the points of electric welding distruted on the closing side elements 101 and 102 to avoid projections of molten zinc to the interior of the motor when the metal melts.

The two notches 14 and 15 respectively make an angle ($\alpha/8$) and ($\alpha/8 + \alpha/2$) with the axis of the pole 180 and of pole 181 which is diametrically thereopposite and cooperate, one or the other, depending on the direction of assembly of a polar piece, with semi-cuts-outs 71 and a pressed portion 72 provided along a generatrix of the magnetic housing or carcase 7. This generatrix is the one diametrically opposite the opening 70 adapted for passage of the wire-passes.

It is the fit of these semi-cutouts and the pressed portion in the notches 14 or 15 which enables a strict relative angular positioning of the poles 18 to be obtained.

Figure 2:
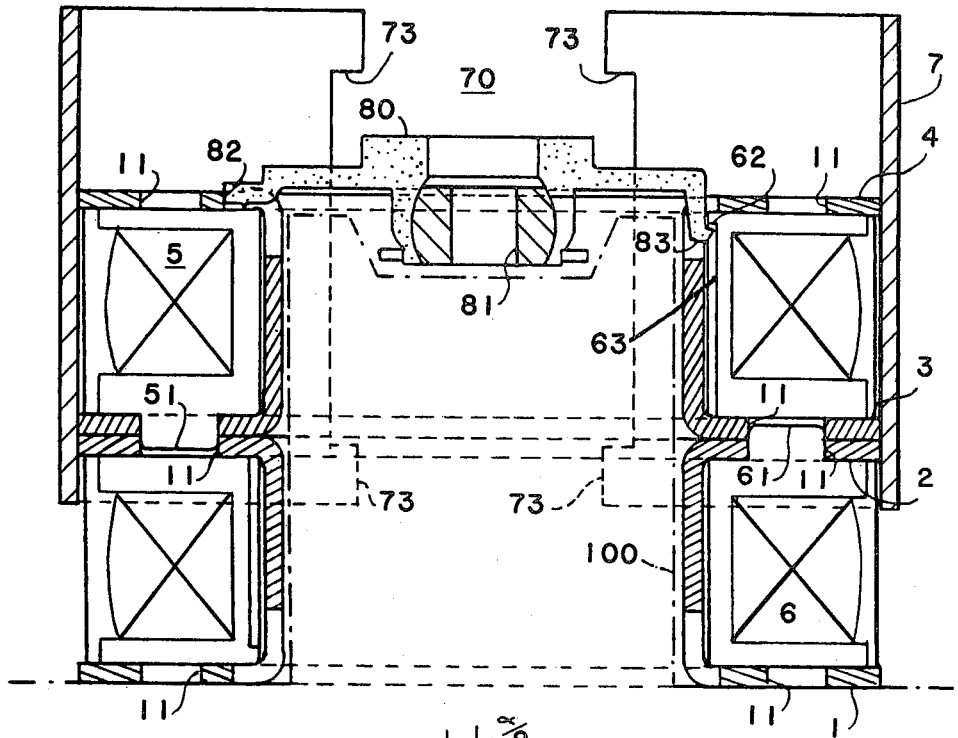
FIG. 2 is a view of the stator in the course of assembly thereof, in section.

Thus defined, the stator part of the motor according to the invention allows simple assembly by stacking (FIG. 2) the components for example on a cylindrical element 100 of diameter substantially equal to that of the rotor 92.

The polar pieces and the coils are successively stacked in order and in suitable direction. The presence of the holes 11 cooperating with the lugs 51/61 and of the notches 16 corresponding to the screens 67, imposes a relative pre-orientation of the pieces during assembly. On the last polar piece 4 is fitted the support bearing 80 whose hooks 83 pass by force behind two edges 62, each projecting in two grooves 63 made inside the bore of the coil 5. The carcase 7, made of rolled galvanized sheet metal, has an inner diameter slightly smaller than the outer diameter of the polar pieces. By enlarging its opening 70, without exceeding its elastic limit, this carcase is fitted over the stack of the stator of which the two wire-passes 55, 66 are thus maintained prisoner by the four elements in relief 73. This assembly is then turned over in order to introduce therein the rotor 92 fast with the shaft 9. Washers 95, a spring 94 and a sliding piece 93 conventionally maintain the rotor and its magnet 90 inside the stator on which is placed the second support bearing 85 whose hooks 83 lock in the grooves 63 in the coil 6.

Due to the hooks 83, limiting the action of the spring 94, and to the clamping of the carcase 7 on the polar pieces, a solid assembly is thus obtained, which is easy to transport onto an electric welding station where the motor is definitively closed by two side elements 101 and 102.

The motor forming the subject matter of the invention allows large-scale production of small synchronous or step-by-step motors with multiple uses in industry.

What is claimed is:

1. A small electric motor comprising:
   first and second bearings;
   a shaft mounted for rotation in said bearings;
   a rotor having a permanent magnet and secured for rotation to said shaft;
   a stator assembly including two annular coils and pole piece means disposed inside a housing of magnetic material;
   wire pass means extending radially outward from said coils; and
   means for maintaining said stator assembly pre-assembled in the course of assembly of said motor, said means for maintaining comprising a support bearing of insulating material for receiving on one of said first and second bearings hook means projecting radially outward from said support bearing, recessed element means disposed in said coils for receiving and engaging said hook means, said housing having an opening defined therein with projections for positionally fixing said wire pass means.

2. A small electric motor according to claim 1 wherein said hook means comprises first and second angularly spaced hook members, and wherein said recessed element means comprise first and second recesses in said coils positioned to receive and engage said first and second hook members, respectively.

3. The small electric motor according to claim 2 wherein said pole piece means has at least two diametrically opposite poles and at least first and second holes of said substantially equal diameter defined therein located on a common radius and disposed at 90° with respect to the axis of symmetry of said two opposite poles, wherein said pole piece means also includes two radial notches respectively making an angle of ($\alpha/8$) and ($\alpha/2 + \alpha/8$) with respect to said axis of symmetry, wherein $\alpha$ is the number of pairs of poles on a coil of the motor, wherein said coils each include a projection adapted to be received in a respective one of said two holes to angularly orient said coils relative to said pole pieces, and wherein said housing includes pressed portions which are positioned to engage said notches.

* * * * *